United States Patent [19]
Jacobsen et al.

[11] Patent Number: 5,703,422
[45] Date of Patent: Dec. 30, 1997

[54] MAGNETIC ECCENTRIC MOTION MOTOR

[75] Inventors: Stephen C. Jacobsen; Clark C. Davis, both of Salt Lake City, Utah

[73] Assignee: Sarcos, Inc., Salt Lake City, Utah

[21] Appl. No.: 467,710

[22] Filed: Jun. 6, 1995

Related U.S. Application Data

[62] Division of Ser. No. 88,178, Jul. 7, 1993, Pat. No. 5,426,336, which is a division of Ser. No. 663,444, Mar. 1, 1991, Pat. No. 5,252,870.

[51] Int. Cl.$^6$ ............................................. H02K 7/06
[52] U.S. Cl. ................................................. 310/82; 310/80
[58] Field of Search .............................. 310/80, 82, 154, 310/254

[56] References Cited

U.S. PATENT DOCUMENTS

| | | | |
|---|---|---|---|
| Re. 29,081 | 12/1976 | Grundmann | 335/228 |
| 3,914,629 | 10/1975 | Gardiner | 310/46 |
| 4,123,691 | 10/1978 | Seilly | 318/119 |
| 4,214,180 | 7/1980 | Kuwako et al. | 310/80 |
| 4,234,831 | 11/1980 | Kemmer et al. | 318/115 |
| 4,439,702 | 3/1984 | Belikov et al. | 310/80 |
| 4,709,362 | 11/1987 | Cole | 367/189 |
| 4,712,027 | 12/1987 | Karidis | 310/12 |
| 4,774,440 | 9/1988 | Bhadra | 310/81 |
| 4,954,735 | 9/1990 | Parsons | 310/82 |
| 5,030,866 | 7/1991 | Kawai | 310/82 |

*Primary Examiner*—Steven L. Stephan
*Assistant Examiner*—Michael Wallace, Jr.
*Attorney, Agent, or Firm*—Thorpe, North & Western, LLP

[57] ABSTRACT

An eccentric-motion motor for driving a utilization mechanism includes a stator defining a closed surface pathway, an armature composed of a permanent magnet rollably disposed on the closed surface pathway, a series of electromagnetic elements disposed in the stator along the closed surface pathway, circuitry for successively energizing the electromagnetic elements to cause them to attract and/or repel the armature so that it rolls along the closed surface pathway, and a coupler mechanism for coupling the armature to the utilization mechanism so that as the armature is caused to roll, the utilization mechanism is powered by the operation of the motor.

3 Claims, 10 Drawing Sheets

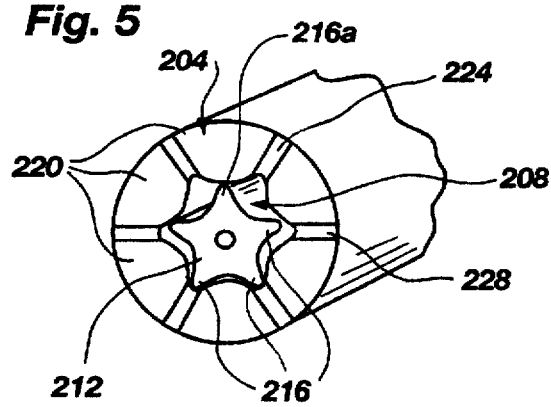
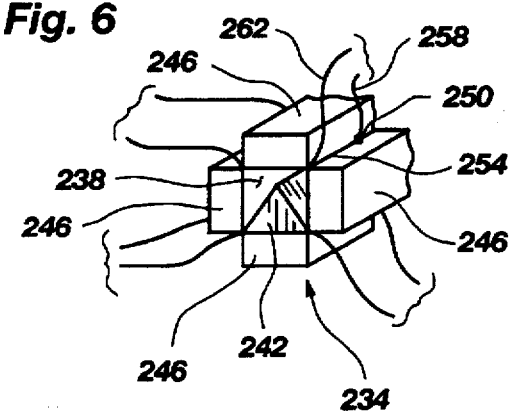
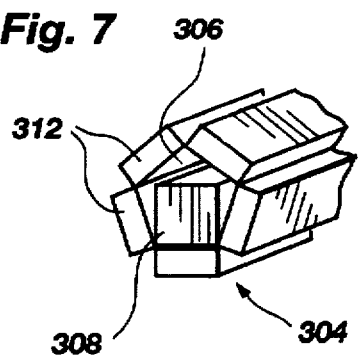
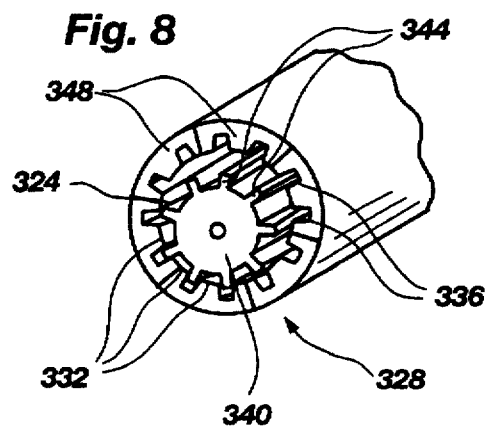
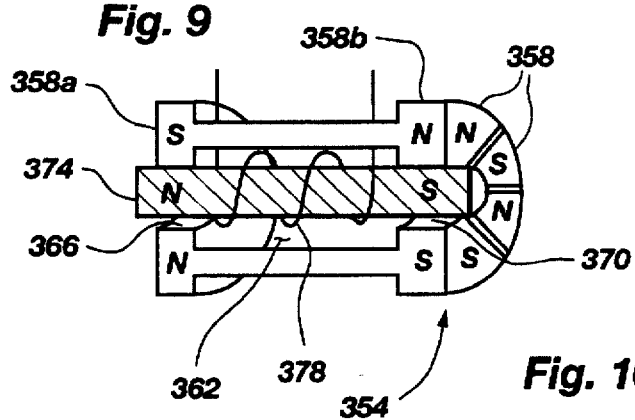
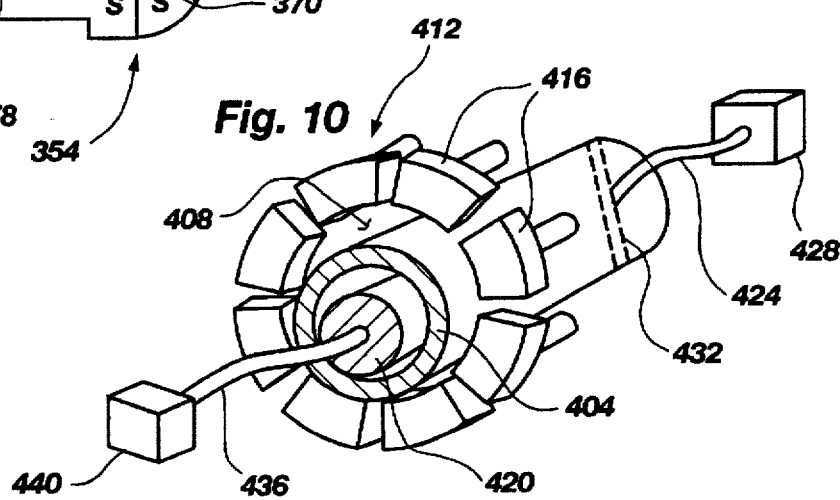

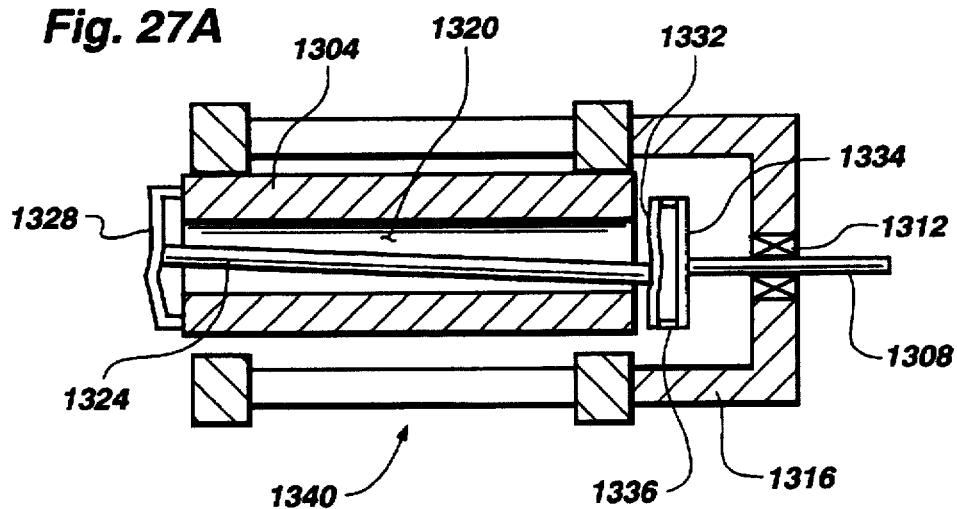
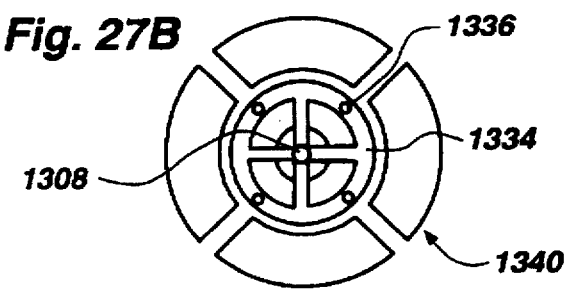
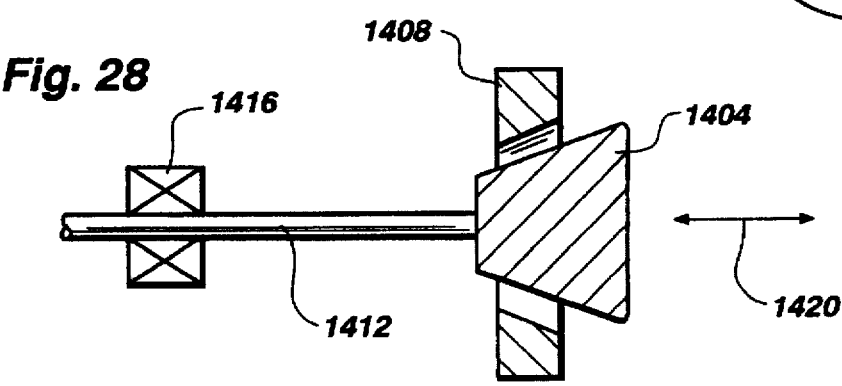

MAGNETIC ECCENTRIC MOTION MOTOR

This application is a divisional of application Ser. No. 08/088,178 filed Jul. 7, 1993, now U.S. Pat. No. 5,426,336 issued Jun. 20, 1995 which is a divisional of application Ser. No. 08/663,444 filed Mar. 1, 1991 now U.S. Pat. No. 5,252,870 issued Oct. 12, 1993.

BACKGROUND OF THE INVENTION

This invention relates to a magnetically actuated eccentric motion motor having an armature which rolls within a stator.

Electric motors typically consist of a fixed stator and a rotatable armature, between which electromagnetic forces are produced to cause the armature to rotate. The armature is mounted or carried by bearings to maintain a certain spacing between the armature and the stator and this, of course, gives rise to friction. Also, the further the spacing between the armature and stator, the weaker are the electromagnetic forces.

A number of proposals have been made for a motor or actuator in which an armature or roller rolls inside a cylindrical cavity as a result of electromagnetic forces. The electromagnetic forces are produced in some sequence along the perimeter of the cavity to attract the armature which is made of a ferromagnetic material. See, for example, U.S. Pat. Nos. 2,561,890, 4,728,837 and 4,482,828, German Patent No. DAS 1132229 and Swiss Patent No. 159,716. Disadvantages of such prior art mechanisms are that the mechanisms are generally quite bulky and heavy, are not easily miniaturized, and have low energy densities. This bulkiness and weight arises from the need of mechanism components capable of developing sufficient electromagnetic forces to properly operate the mechanism.

Electrostatic motors likewise generally include a stator and armature mounted to rotate near or within the stator, where the forces of attraction therebetween are electrostatic rather than electromagnetic. Examples of electrostatic motors are shown in U.S. Pat. Nos. 735,621, 3,297,888, 3,517,225 and 4,225,801. In a recently issued U. S. Pat. No. 4,922,164, an eccentric motion, electrostatic motor is described in which a cylindrical armature is disposed in rolling engagement with a hollow cylindrical stator. Elongate conductive strips are disposed in the inside wall of the hollow of the stator and are circumferentially spaced about the hollow. The conductive strips successively receive electrical charges to thereby attract the armature and cause it to roll in the hollow of the stator. Electrostatic motors are generally lighter in weight and potentially smaller in size than electromagnetic motors, but the attractive forces are generally weaker.

SUMMARY OF THE INVENTION

It is an object of the invention to provide an electromagnetic motor which may be easily miniaturized without sacrificing the strength of the attractive forces needed for the desired operation.

It is another object of tile invention to provide such a motor in which both magnetic attractive forces and magnetic repelling forces can be utilized to operate the motor.

It is a further object of the invention to provide such a motor in which frictional forces between the stator and armature are minimized.

It is also an object of the invention to provide such a motor which has a high energy density at high gear ratios.

It is an additional object of the invention to provide such a motor which is simple in design and easy to construct and utilize.

The above and other objects of the invention are realized in a specific illustrative embodiment of a magnetic eccentric-motion motor which includes a stator defining a continuous closed surface pathway, an armature composed of a permanent magnet rollably disposed on the closed surface pathway, a series of electromagnetic elements disposed in the stator at the closed surface, where the elements are selectively energizable to alternately attract and repel the armature to cause it to roll along the closed surface pathway, and a circuit for selectively energizing the electromagnetic elements. A coupling mechanism may be used to couple the rotation of the armature to a utilization device where the mechanical power output of the motor may be put to practical use.

In accordance with one aspect of the invention, the electromagnetic elements include elongate electromagnets disposed in the stator at spaced-apart locations along the pathway, with the electromagnets being generally parallel with one another so that respective poles of the electromagnets are in alignment. Also, the armature includes an elongate, generally cylindrical bar whose poles are positioned to roll in pathways adjacent respective aligned poles of the electromagnets. The energizing circuit includes commutator circuitry for successively supplying electrical current to the electromagnets to alternately cause the electromagnets to attract and repel the armature as it rolls along the pathway.

BRIEF DESCRIPTION OF THE DRAWINGS

The above and other objects, features and advantages of the invention will become apparent from a consideration of the following detailed description presented in connection with the accompanying drawings in which:

FIG. 5 is a perspective, partially fragmented view of one configuration of an eccentric motion motor of the present invention which can be utilized as a pump;

FIG. 6 is a perspective, partially fragmented view of a magnetic eccentric-motion motor having a stator with a generally square cross-section and an armature with a generally triangular cross-section;

FIG. 7 is a perspective, partially fragmented view of a magnetic eccentric-motion motor having a stator with a pentagonal cross-section and an armature with a square cross-section;

FIG. 8 is a perspective, partially fragmented view of a magnetic eccentric-motion motor having a stator and armature formed with a gear track and gear teeth respectively;

FIG. 9 is a perspective and cross-sectional view of another embodiment of a magnetic eccentric-motion motor made in accordance with the principles of the present invention in which the armature is formed as an electromagnet;

FIG. 10 is a perspective, partially fragmented view of another embodiment of a magnetic eccentric-motion motor in which two armatures, one disposed within the hollow of the other, are employed;

FIGS. 27A and 27B show respectively a side, cross-sectional view and an end view of a flexible coupling mechanism for use with magnetic eccentric-motion motors of the present invention;

FIG. 28 is a side, cross-sectional view of a magnetic eccentric-motion motor having an adjustable gear ratio;

The specifically claimed embodiment is illustrated in FIG. 9. However, it should be remembered that the novelty of the claimed invention can be adapted so as to be applicable to nearly all of the embodiments of the present invention which are taught herein. An understanding of the description of FIG. 9 is sufficient to teach the invention such that the other embodiments can be modified to incorporate the claimed invention.

DETAILED DESCRIPTION

The specifically claimed embodiment is illustrated in FIG. 9. However, it should be remembered that the novelty of the claimed invention can be adapted so as to be applicable to nearly all of the embodiments of the present invention which are taught herein. An understanding of the description of the FIG. 9 is sufficient to teach the invention such that the other embodiments can be modified to incorporate the claimed invention.

Figure 1:
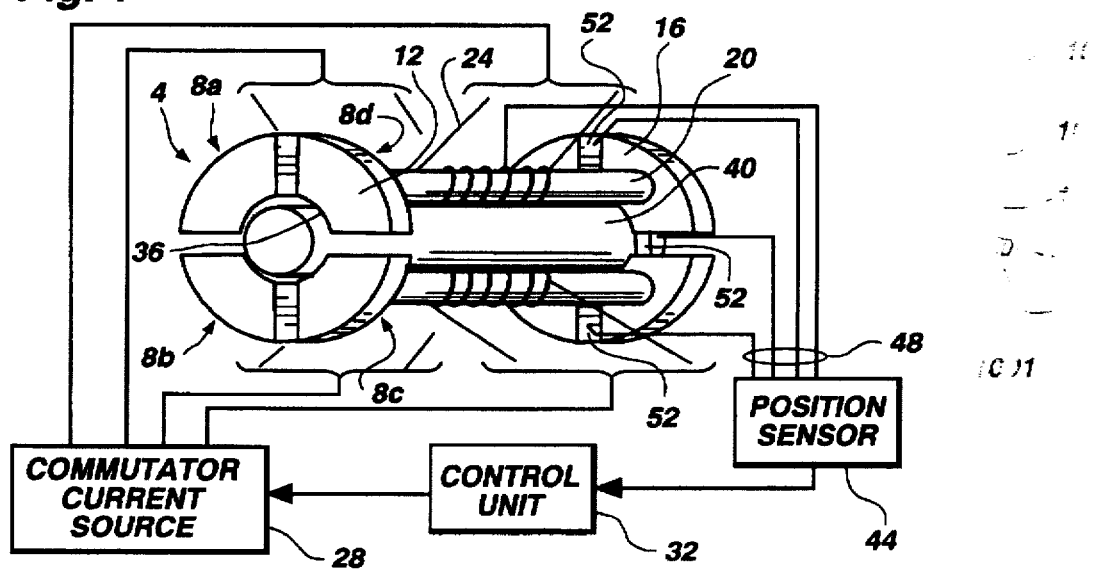
FIG. 1 is a perspective view of a magnetic eccentric-motion motor made in accordance with the principles of the present invention.

Referring to FIG. 1, a magnetic eccentric-motion motor made in accordance with the present invention is shown. The motor includes a stator 4 formed from four electromagnets 8a, 8b, 8c and 8d. Each electromagnet includes end pieces 12 and 16 mounted on opposite ends of a core rod 20, all made of a ferromagnetic material. Wound about each of the core rods is an electrically conductive coil wire, such as wire 24. The coils wound about each of the core rods are coupled to a commutator current source 28 which, in response to signals from a control unit 32, supplies electrical current to the coils in a predetermined order and with a predetermined polarity, as will be discussed momentarily. That is, the current source 28 supplies electrical current to the coils either in one direction or the opposite direction, or simply supplies no current to the coils, all under control of the control unit 32.

Figure 2:
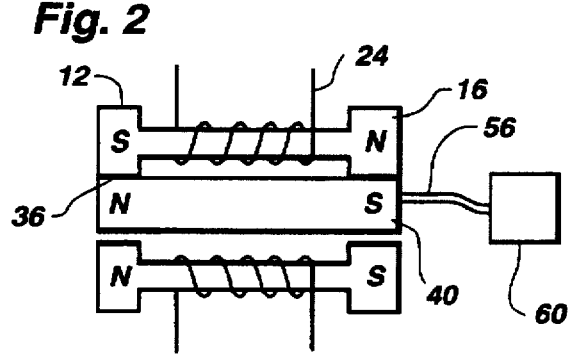
FIG. 2 is a side, cross-sectional view of the motor of FIG. 1.

The end pieces, such as end pieces 12 and 16 of the electromagnet 8d, are formed in the shape of arcs having an inner arcuate surface area, such as surface area 36 of end piece 12, which defines a portion of an arcuate pathway, along with the other end pieces, over which an elongate, generally cylindrical armature 40 may roll. Armature 40, which serves as the armature of the motor, constitutes a permanent magnet having a north pole and south pole as illustrated in FIG. 2. Obviously, the armature 40 is made of a suitable magnetic material well known in the art.

The inner arcuate surface areas of the end pieces of the electromagnets, such as surface area 36, might advantageously be coated with a wear resistant material such as silicon nitride, to prevent wear from occurring between the armature 40 and the surfaces of the end pieces.

A position sensor circuit 44 is coupled by conductors 48 to sensing elements 52 positioned between respective end pieces of the electromagnets 8a, 8b, 8c and 8d and in the pathway defined by the inner arcuate surfaces of the end pieces, as shown in FIG. 1. These sensing elements might illustratively be field effect transistor devices which receive a current from the position sensor circuit 44 and whose current flow therethrough varies depending upon the position of the armature 40 and the known prescribed applied voltage. In this manner, position sensor circuit 44 can determine the location of the armature 40 in the stator 4.

Figure 3A:
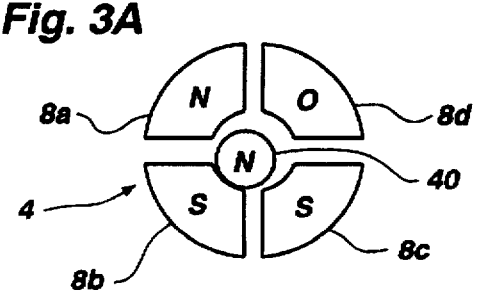
FIGS. 3A, 3B and 3C graphically illustrate successive positions of an armature rolling in a stator as electromagnets of the stator are variously energized.
Figure 3B:
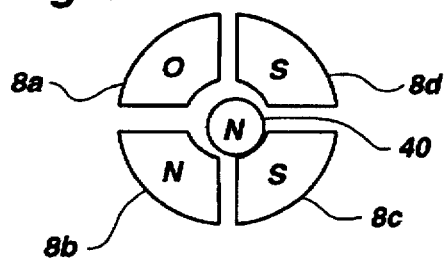
Figure 3C:
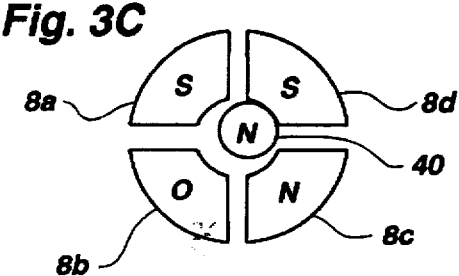

The position sensor circuit 44 signals the control unit 32 identifying the position of the armature 40, and the control unit 32 in turn signals the commutator current source 28 to supply electrical current to the appropriate electromagnet to produce both magnetic attraction and magnetic repulsion between selected ones of the electromagnets and the permanent magnet armature 40. A graphic representation of an exemplary sequence for energizing the electromagnets 8a, 8b, 8c and 8d to cause the armature 40 to roll within the stator is shown in FIGS. 3A through 3C. Only one end of each of the electromagnets is shown in FIGS. 3A through 3C, with the instantaneous polarities of those ends being illustrated by the letters "N" (representing a north polarity), "S" (representing a south polarity), and "O" (representing a neutral or null polarity). In FIG. 3A, the armature 40, which shows a north pole end in FIG. 3A, is positioned against the end piece of armature 8b which exhibits a south polarity. The end piece of electromagnet 8a exhibits a north polarity, and the end piece of electromagnet 8c exhibits a south polarity. The armature is thus being repelled by the end piece of the electromagnet 8a and being attracted by the end pieces of electromagnets 8b and 8c. This forces the armature 40 to move in the counter-clockwise direction in the stator 4. In FIG. 3B, three of the end pieces of the electromagnets have changed polarities as illustrated so that the armature is now attracted toward the end pieces of electromagnets 8c and 8d, but is repelled by the end piece of electromagnet 8b, so that the armature continues its movement in the counter-clockwise direction. Finally, in FIG. 3C, three of the end pieces of the electromagnets have again changed polarities so that the armature 40 is now being repelled by the end piece of electromagnet 8c, and being attracted by the end pieces of electromagnets 8d and 8a, to continue rolling movement of the armature 40 in the counter-clockwise direction. The magnetic forces produced at the opposite end of the motor from that shown in FIGS. 3A through 3C would likewise cause the armature 40 to roll in the direction indicated in FIGS. 3A through 3C.

Because the armature 40 is in rolling contact, or in close proximity, with the arcuate inner surfaces of the end pieces of the electromagnets 8a, 8b, 8c and 8d, the magnetic forces developed between the armature and electromagnets are quite strong. Also, less friction results from the armature movement because it is in rolling contact with the stator and is not supported by bearings. Further, as described in U.S. Pat. No. 4,922,164, gear reduction is intrinsically achieved without requiring special gearing.

Referring to FIG. 2, the armature 40 is shown coupled by a flexible coupling mechanism or shaft 56 to a utilization unit 60 which is driven by the rotation of the armature. In this manner, the energy of the motor of FIGS. 1 and 2 is harnessed and used various constructions of coupling mechanisms are fully discussed in U.S. Pat. No. 4,922,164, which is incorporated herein by reference.

The control unit 32 might illustratively be a microprocessor or other stored program control unit currently available on the market such as DEC VAX-LAB or IBM PC. The commutator current source 28 might illustratively be a motor driven rotary switch including a wiper element which simultaneously connects a current source of proper polarity to selected ones of the wire coils 24 in the proper sequence as the wiper element is caused to rotate. Alternatively, the commutator current source 28 might be a conventional electronic commutator capable of energizing the electromagnets in the proper sequence and with the proper polarity.

The position sensor 44 might illustratively be a current source for supplying current to each of the sensing elements 52 and a current detector or bank of detectors for determining the current level, i.e., the magnitude of the current being conducted by each of the sensing elements, and then a signalling circuit for signalling the control unit 32 in a manner to identify which sensing element 36 the armature 40 is closest to.

Alternative armature position sensing arrangements might include optical sensing in which the armature 40 is disposed to roll in a hollow cylindrical casing positioned centrally among the electromagnets, and in which the interior of the casing is illuminated. Light passing through openings positioned circumferentially about the casing would be monitored to determine the position of the armature 40. Obviously, when the armature were in a position to cover certain of the openings, no light would pass therethrough thereby identifying the location of the armature.

Figure 4:
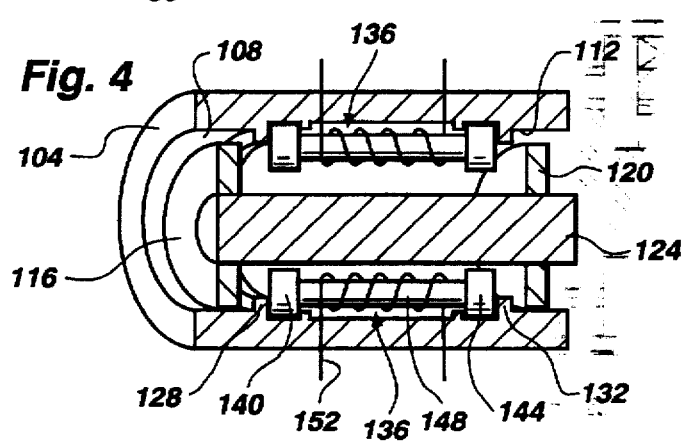
FIG. 4 is a perspective and cross-sectional view of another embodiment of a magnetic eccentric-motion motor made in accordance with the principles of the present invention.

FIG. 4 shows a perspective, partially cross-sectional view of another embodiment of the present invention in which a generally cylindrical hollow casing or housing 104 is provided. At both ends of the casing 104, tracks 108 and 112 are formed to allow rolling thereover of respective disks 116 and 120 which are mounted on respective ends of an armature 124. A pair of ridges or ribs 128 and 132 are formed on the interior surface of the casing 104 to prevent axial movement of the armature 124 since the interior diameter of the ridges is less than the diameter of the disks 116 and 120. Disposed on the interior of the casing 104 and spaced circumferentially thereabout are a plurality of electromagnets 136. Each electromagnet 136 includes end pieces 140 and 144, a core (in the form of a bar) 148 and a wire coil 152 wound about each core 148.

The armature 124 in the embodiment of FIG. 4 may either be a permanent magnet, as with the FIGS. 1 and 2 embodiment, or it may be made simply of a magnetically attractable material. If the armature 24 is a permanent magnet, then the sequence of alternately attracting and repelling the armature, as described in connection with FIGS. 3A through 3C, could be employed to drive the armature and cause the disks 116 and 124 to roll over the tracks 108 and 112 respectively. If the armature 124 is made of a magnetically attractable material, then the electromagnets 136 would simply be energized and de-energized in succession to attract the armature 124 (not repel) and again cause the disks 116 and 120 to roll on tracks 108 and 112. Provision of a permanent magnet armature allows for production of greater attractive forces (as well as repulsive forces) than are possible if the armature is simply made of magnetically attractable material.

FIGS. 5, 6, 7 and 8 all show end perspective, partially fragmented views of various alternative configurations for armature and stator designs for the motor of the present invention. FIG. 5 shows a stator 204 having a type of hexagonal interior cavity 208 in which is disposed an armature 212 having a star-shaped cross-section. The sidewalls of the interior cavity 208 are formed in conjunction with the armature 212 so that points or ribs 216 of the armature are maintained in continuous sliding contact with the sidewalls of the interior cavity as the armature rotates. The stator 204 and cavity 208 walls shaped as shown to allow such continuous contact as the armature rotates is known as a gyrator. Again the armature 212 is a permanent magnet and the stator 204 is composed of a plurality of electromagnets 220 (windings, current source, etc. are not shown to maintain the simplicity of the drawing, but provision of such structure could be similar to that shown in FIG. 1).

The FIG. 5 motor configuration of the present invention could be utilized as a pump in which fluid would be introduced into the interior of the stator 204 at some location between the ridges 216 of the armature 212 and then as the armature were caused to rotate, such fluid could be forced out of the stator at another location. For example, fluid could be introduced in opening 224 as the armature 212 were rotated with ridge 216a moving towards the opening. Then, as ridge 216a rotated away from opening 224 towards opening 228, the fluid would be forced from the interior of the stator 204.

FIG. 6 shows a stator 234 defining an interior hollow 238 which has a square cross section. Disposed in the hollow 238 is an armature 242 having a triangular cross section. The stator 234 includes four electromagnets 246 positioned about the hollow 238 to alternately attract and repel the armature 242 to cause it to incrementally rotate (or roll) within the hollow. Disposed at the corners at the hollow 236 are pairs of armature location sensors 250 and 254 for being contacted as the armature 242 moves within the hollow 238. When the armature 242 contacts the respective pairs of sensors, a circuit between corresponding conductors 258 and 260 is closed and this condition is sensed by a position sensing circuit to provide information to a control unit which in turn controls the application of electrical current from a commutator current source to the electromagnets 246, as previously described.

FIG. 7 shows still another motor configuration of the present invention in which a stator 304 defines a pentagonal hollow 306 in which an armature 308, having a generally square cross section, is disposed to roll. The stator 304 includes five electromagnets 312 disposed circumferentially about the hollow 306 for selective energization to cause the armature 308 to move in a stepwise fashion about the hollow 308. Armature location sensors (not shown) could also be provided between the electromagnets 312 to complete or close a circuit when the sensors were contacted by a corner of the armature, as described for the FIG. 6 embodiment.

FIG. 8 shows an embodiment of the motor of the present invention in which the interior hollow 324 formed by a stator 328 includes a series of splines 332 and grooves 336 formed on the interior sidewall thereof to extend longitudinally in the stator and spaced circumferentially on the sidewall. An armature 340 is disposed in the hollow of the stator and includes gear teeth 344 which extend longitudinal along the armature and are spaced circumferentially thereabout, with the teeth being dimensioned to fit into the grooves 336 and allow the splines 332 to be received in the spaces between the teeth. In the manlier already described, the armature 340 is caused to roll in the hollow 324 of the stator as electromagnets 348 are selectively energized.

FIG. 9 shows an embodiment of the motor of the present invention in which a stator 354 is formed from a plurality of elongate permanent magnets 358 disposed generally parallel with one another and circumferentially about a hollow 362. Enlarged end pieces 358a and 358b are formed in the electromagnets 358 and are positioned adjacent one another to define interior, arcuate tracks 366 and 370. Disposed in the hollow 362, to roll on the tracks 366 and 370 is an elongate, cylindrical armature 374 made of a ferromagnetic material. A coil of wire 378 is helically wound about the hollow 362 so as to be out of contact with the armature 374 as it rolls on the tracks 366 and 370. The permanent magnets 358 are positioned so that adjacent end pieces 358a and 358b of the different permanent magnets exhibit different polarities. For example, end pieces 358b show a north polarity in the topmost permanent magnet and then show a south polarity in the next permanent magnet, proceeding clockwise about the stator, followed by a north polarity again, etc.

The motor of FIG. 9 is operated by supplying current of selectively alternating polarity to successively reverse the polarity of the armature 374 and thereby successively attract and repel the armature from the different permanent magnets 358 to cause the armature to roll within the hollow 362. In the embodiment shown in FIG. 9, the armature is shown being attracted toward the uppermost permanent magnet 358. Upon switching polarities of the armature 374, the armature would then be attracted toward the next permanent magnet, proceeding clockwise, and would be repelled by the topmost permanent magnet, etc. In this manner, the armature 374 would be caused to roll on the tracks 366 and 370 within the hollow 362 as desired.

Although not shown, the armature 374 could be formed with disks, such as shown in FIG. 4, to roll on special tracks formed in a hollow casing, such as also shown in FIG. 4. This, of course, would inhibit wear from occurring between the permanent magnets and the armature 374. The FIG. 9 motor also utilizes a simpler commutator current source since only one wire coil 378 need be switched between polarities, i.e., from one to the other and then back to the one, etc. Of course, when multiple electromagnets are used, as with other embodiments of the invention, multiple coils are required and each of these coils must be selectively energized.

Figure 9A:
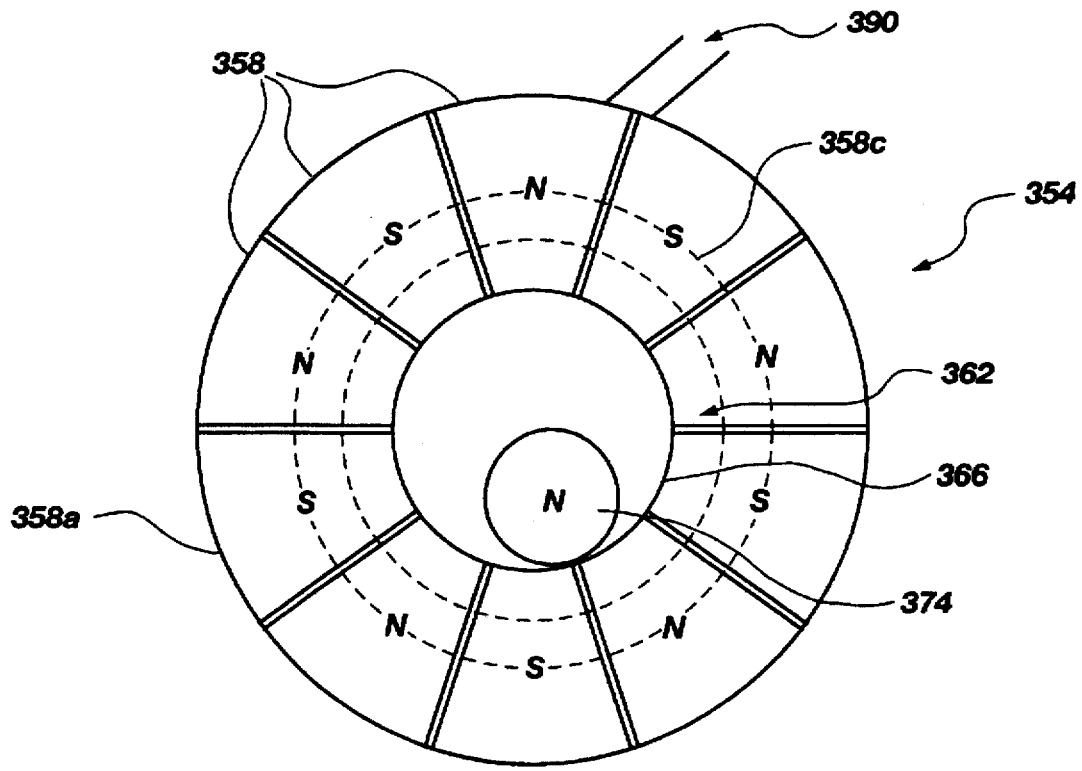
FIG. 9A is a front end view of an embodiment for suspending the wire coil within the stator and out of contact with the stator and armature of the magnetic eccentric-motion motor of FIG. 9.
Figure 9B:
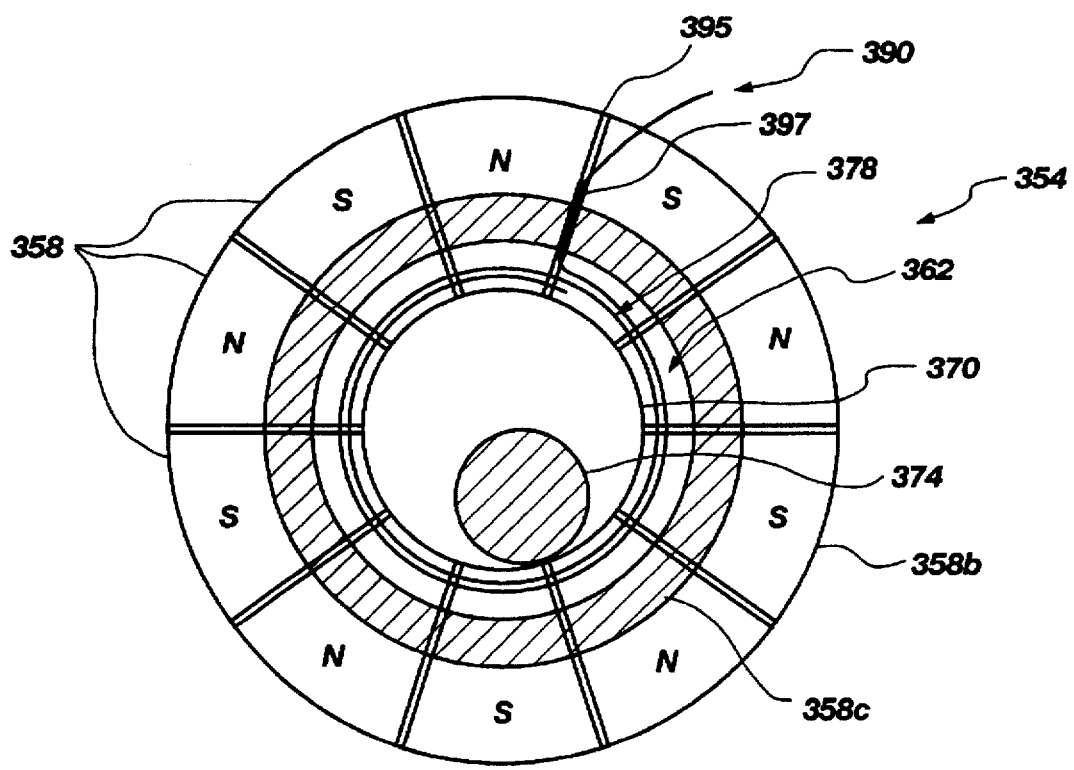
FIG. 9B is a front end, cross-sectional view of an embodiment for suspending the wire coil within the stator and out of contact with the stator and armature of the magnetic eccentric-motion motor of FIG. 9.
Figure 9C:
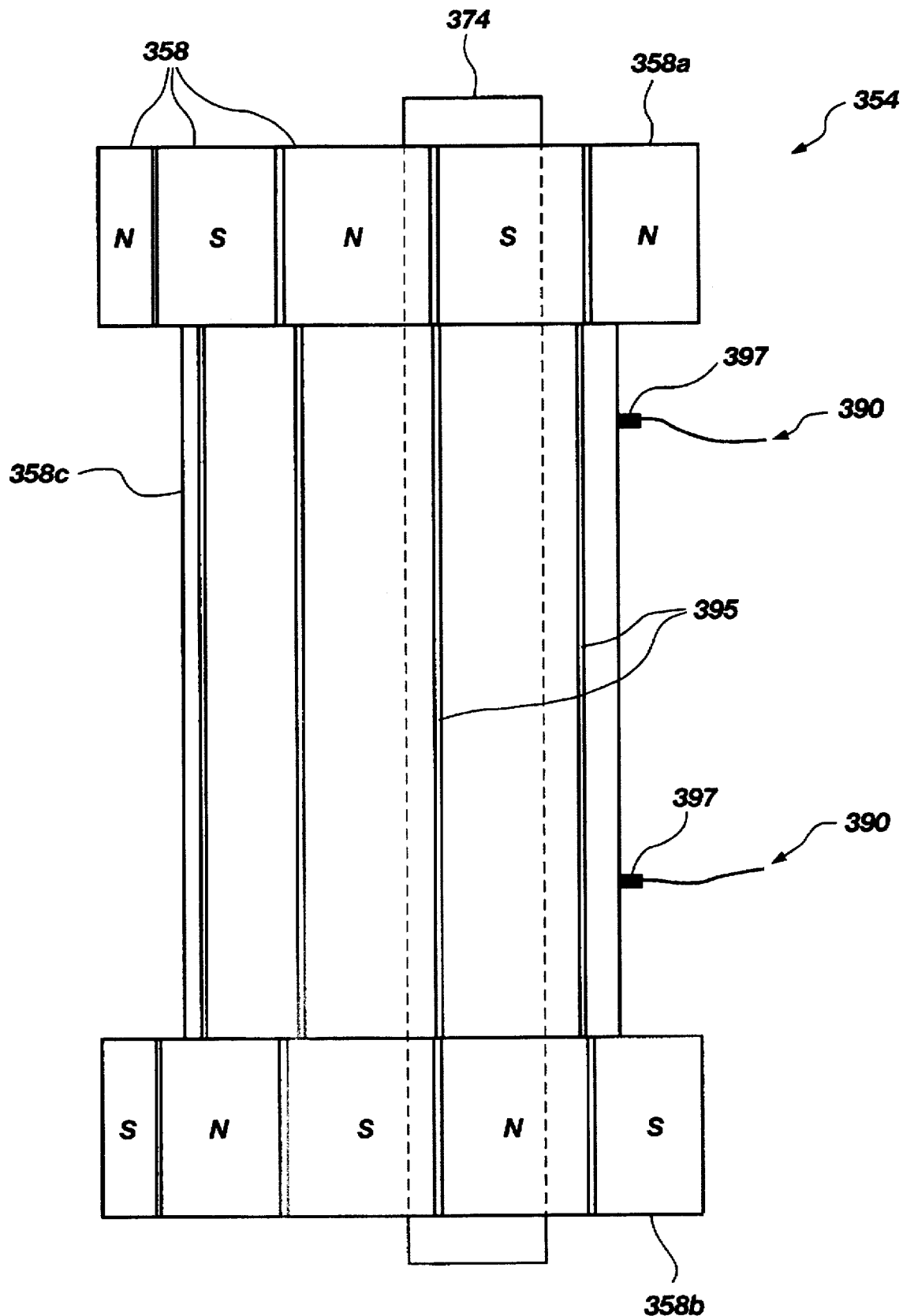
FIG. 9C is a top plan view of an embodiment for suspending the wire coil within the stator and out of contact with the stator and armature of the magnetic eccentric-motion motor of FIG. 9.

The FIG. 9 embodiment is clarified by FIGS. 9A, 9B, and 9C. FIG. 9A is a front end view of the embodiment where the enlarged end pieces 358a of the magnets 358 are shown in relation to the narrow portion 358c (shown in hidden lines). This view clarifies the hollow 362 (or space) available between the arcuate track 366 and the narrow portion 358c for disposing the coil of wire 378 out of contact with both the armature 374 and the stator 354 and allowing the armature to rotate on the track without contacting the coil of wire.

FIG. 9B shows a front end, cross-sectional view of the FIG. 9 embodiment for suspending the wire coil 378 within the stator 354 and out of contact with the stator and armature 374. The enlarged end pieces 358b are shown in relation to the cross-section of the narrow portion 358c. The coil 378 is shown suspended in the hollow 362 between the narrow portion 358c and the arcuate track 370. The coil 378 is suspended by leads 390. These leads 390 extend through apertures 395 in the stator 354 and are electrically insulated from the stator by means of a sleeve 397 that is disposed in the apertures between the magnets 358 of the stator so that current can travel into and out of the wire coil 378 without affecting the polarity of the stator.

FIG. 9C shows a top plan view of the FIG. 9 embodiment that emphasizes the difference in the size of the narrow portion 358c and the enlarged end pieces 358a and 358b. Also emphasized in FIG. 9C are the apertures 395 between the permanent magnets 358.

Those skilled in the art and viewing FIG. 9 will understand that FIGS. 9A–9C clarify the structure disclosed in FIG. 9.

FIG. 10 shows an electromagnetic eccentric-motion motor having a hollow cylindrical armature 404 disposed within a hollow 408 of a stator 412 formed from a plurality of circumferentially positioned electromagnets 416. Disposed in the hollow armature 404 is a solid cylindrical armature 420 having a diameter less than the inside diameter of the armature 404 to allow the armature 412 to roll within the armature 404. The armatures 404 and 420 are made of a magnetically attractable material so that as the electromagnets 416 are successively energized, the armatures 404 and 420 are caused to roll—armature 404 within the hollow 408 of the stator 412, and the armature 420 within the hollow of armature 404. Both armatures 404 and 420 would be attracted toward the same electromagnets at the same time, but armature 404, having a larger diameter than armature 420, would roll at a different angular velocity to thus provide two sources of power having different torques and speeds.

Armature 404 is coupled by way of a coupling shaft 424 to a utilization unit 428 which is driven by rotation of the armature 404 and thus the shaft 424. The shaft 424 might illustratively be connected directly to the armature 404 or it might be connected to a cross piece 432 (shown by dotted line) which bridges the end of the armature. Armature 420 is coupled by way of a coupling shaft 436 to a utilization unit 440 as shown in FIG. 10.

Figure 11A:
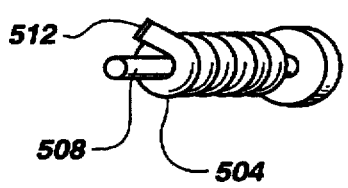
FIGS. 11A and 11b show perspective and side, cross-sectional views respectively of an electromagnet wound with a strip conductor made in accordance with the principles of the present invention.
Figure 11B:
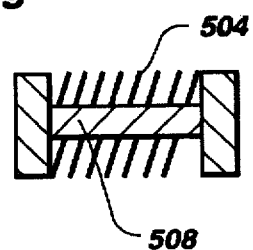

FIGS. 11A and 11B illustrate one embodiment of a conductor coil which may be utilized with the electromagnets of the present invention. The coil is comprised of a flat strip of conductive material 504 formed to extend in a helical fashion, as best seen in FIG. 11B (side, cross-sectional view) about a core 508 of an electromagnet. Such a coil structure is fairly compact and yet capable of carrying substantial amounts of current. The coil strip 504 would include a coat of insulation to prevent shorting in the coil, with electrical access to the conductive strip being gained by simply making an angular cut 512 to expose an end of the conductive strip through the insulation.

Figure 12:
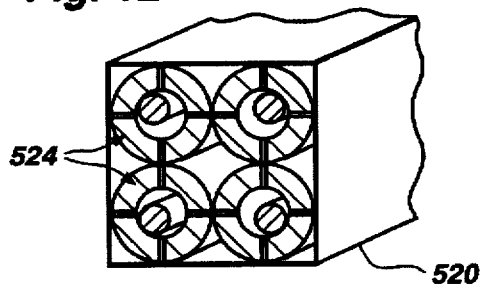
FIG. 12 is a perspective, partially fragmented view of a magnetic, eccentric-motion motor utilizing four stators and four armatures to balance the lateral forces produced during operation of the motor.
Figure 13:
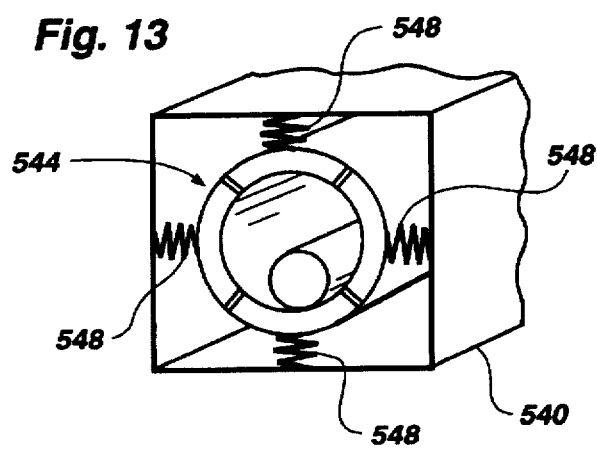
FIG. 13 is a perspective, partially cross-sectional view of a magnetic eccentric-motion motor in which dampening elements connect the stator of the motor with a motor housing to dampen the lateral forces produced by operation of the motor.
Figure 14:
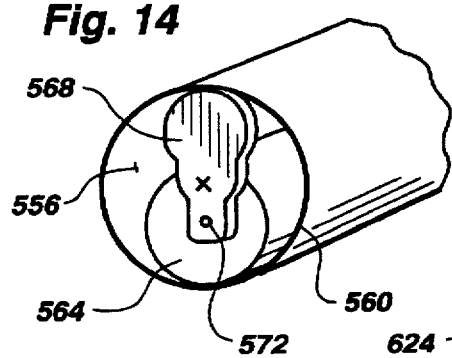
FIG. 14 is a perspective, cross-sectional view of a magnetic eccentric-motion motor which includes a balancing element attached to the armature to balance the lateral forces produced by operation of the motor.

FIGS. 12, 13 and 14 show, in perspective, partially fragmented views, motor arrangements for dampening or balancing the lateral forces produced by the eccentric motion of the motor armatures. FIG. 12 shows a housing 520 in which are disposed four eccentric-motion motors 524 at the corners of the housing. The electromagnets of the motors 524 are energized to cause the armatures thereof to move in symmetrically opposite directions for each pair of diagonally opposed motors, so that the lateral forces created by the motors are effectively cancelled. For example, the armatures of the motors 524 are all shown in positions closest to the corners of the housing 520; from this position, the armatures would be caused to move to a position closest to the center of the housing and then again return to positions closest to the corners, etc. to allow cancellation of the lateral forces produced by movement of the armatures.

FIG. 13 shows an alternative arrangement for dampening the lateral forces produced in an eccentric motion motor made in accordance with the present invention. In this embodiment, a housing 540 is again provided and a motor 544 is held in place in the housing by springs 548 or other suitable shock absorbing elements. With this arrangement, the lateral forces produced by operation of the motor 544 are not balanced but rather are simply dampened by the springs 548. Simple coil springs or more sophisticated shock absorbers, similar to those used in vehicles, could be employed.

FIG. 14 is a perspective, partially fragmented view of another embodiment of a balancing arrangement according to the present invention. Here shown is a hollow 556 of a stator circumscribed by a generally cylindrical casing 560. Electromagnets (not shown) would be disposed circumferentially about the casing 560 to selectively attract and/or repel a cylindrical armature 564 disposed in the casing. Mounted on each end of the armature 564 are balancing bodies, one of which is shown at 568, with the balancing bodies being pivotally mounted at a location coincident with the axis of rotation 572 of the armature. The balancing bodies are thus free to pivot or rotate about the axis 572 as required to provide the desired balancing for the armature. As shown, balancing body 568 extends from the axis of attachment 572 laterally of the armature 564 to a location on the side of the casing 560 opposite that occupied by the armature 564. The balancing bodies could take a variety of shapes, but advantageously would have an arcuate upper end to just fit within the casing 560 so that any movement of tile armature 564 would cause the balancing bodies to slide against the inside surface of the casing and move in a direction to maintain their positions on the opposite of the side casing from the armature. For example, as the armature 564 were caused to roll in the counter-clockwise direction, the balancing body 568 would also move in a counter-clockwise direction (since the interior surface of the casing 560 would force the balancing body in that direction) to thereby maintain the armature 564 and balancing body on opposite sides of the casing. The movement of the armature 564 would thus be balanced, assuming that the combined weights of the balancing bodies was about the same as the weight of the armature, and lateral forces effectively cancelled.

Figure 15:
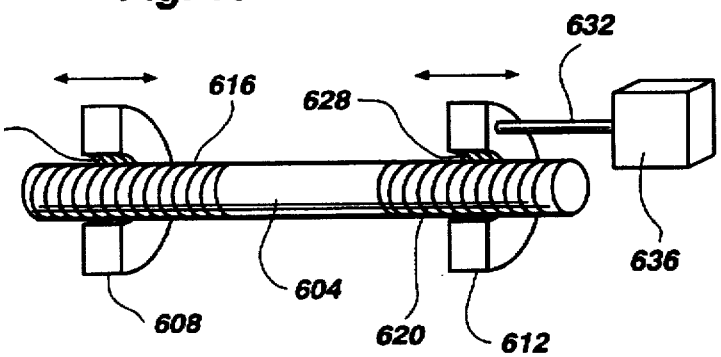
FIG. 15 is a side, perspective, partially cross-sectional view of a magnetic eccentric-motion mechanism for converting rotational movement into translational movement.

FIG. 15 shows a perspective, partially cross-sectional view of an actuator for converting rotational movement of a cylindrical armature 604 into translational movement of two annular fixtures 608 and 612. The armature 604 includes threads 616 and 620 at each of its ends, with the two sets of threads being formed with different sizes. A stator (not shown) would be disposed to circumscribe the armature 604 and cause it to roll on threaded tracks 624 and 628 formed in the interior walls of the annular fixtures 608 and 612 respectively. As the armature 604 rolls, the threads 616 and 620 of the armature mesh with threads 624 and 628 respectively of the annular fixtures 608 and 612 to cause the annular fixtures to move longitudinally relative to the armature as determined by the direction of the meshing threads and by the direction of rolling of the armature.

Annular fixture 612 is shown coupled by a coupling rod 632 to a utilization unit 636 into which the rod may be moved or out of which the rod may be pulled. In this manner, the rolling movement of the armature 604 is converted to a translational movement of the annular fixture 608 and 612 and such translational movement may be used to power the utilization unit 636.

Figure 16:
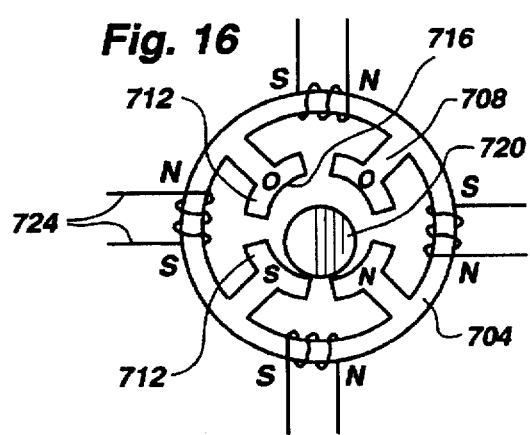
FIG. 16 is a front view of still another embodiment of an electromagnet suitable for use as a stator in the magnetic eccentric-motion motor of the present invention.
Figure 17:
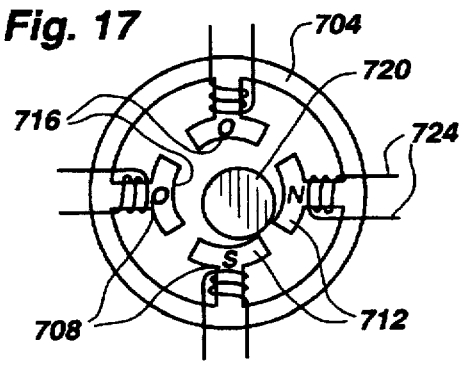
FIG. 17 is a front view of the electromagnet of FIG. 16 but with the electromagnet coils wound about different parts of the structure.
Figure 18:
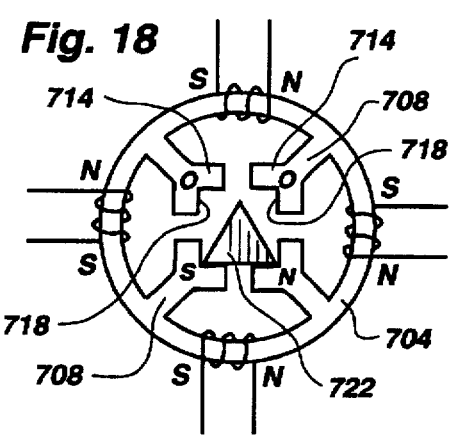
FIG. 18 is a front view of an electromagnet constructed similar to the electromagnets of FIGS. 16 and 17 but with an essentially square rotor pathway.

FIGS. 16, 17 and 18 show front views of stator constructions which may be utilized in the motor of the present invention. Each of the stator constructions includes an outer annular frame or annulus 704 made of a ferromagnetic material. Projecting radially inwardly from the annulus 704 at circumferentially spaced-apart locations are a plurality of posts 708, and formed on the inner termination of each post of the structures of FIGS. 16 and 17 is an arc section 712 which defines an arcuate surface area 716 which, along with the other arc sections, defines a generally circular pathway interior of the annulus. In the FIG. 18 structure, the inner terminations of the posts 708 are formed with right angle corner sections 714 which define a square pathway 718. A generally cylindrical magnetically-attractable armature 720 is disposed to roll on the pathway formed by the arcuate sections 712 of FIGS. 16 and 17 when attracted in the manner previously described. In FIG. 18, an armature 722 having a triangular cross-section is disposed to "flop" in a stepwise fashion about the pathway 718.

Magnetic forces for attracting and/or repelling the armature 720 are produced in FIG. 16 by providing conductor windings on the annulus 704 at locations between each adjacent pair of posts 708. For the FIG. 16 embodiment, there are four posts 708 and thus four windings 724. By selectively energizing the windings 724, the arcuate sections 712 can be magnetically polarized to alternately attract the armature 720 to cause it to roll in the pathway defined by the arcuate sections. Exemplary polarities are illustrated in FIG. 16 with "S" representing a south polarity and "N" representing a north polarity.

In FIG. 17, a different winding arrangement is provided in which the windings 724 are wound about the posts 708 to allow for selectively varying the magnetic polarity of the arcuate section 716.

The FIG. 18 annulus 704 is wound similar to that of FIG. 16, and the polarity of the posts 708 and thus corner sections 714 are successively changed to cause the triangular armature 722 to successively "walk" about the square pathway 718.

Figure 19A:
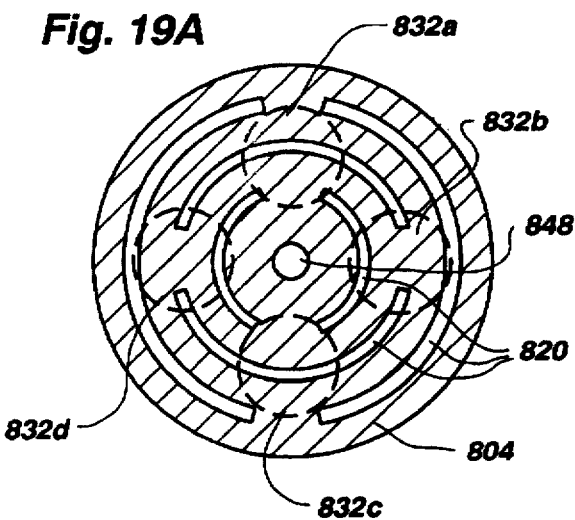
FIGS. 19A and 19B show respectively a top view of a flexible coupling and a side, cross-sectional view of a magnetic eccentric-motion motor which utilizes an inverted conical rotor.
Figure 19B:
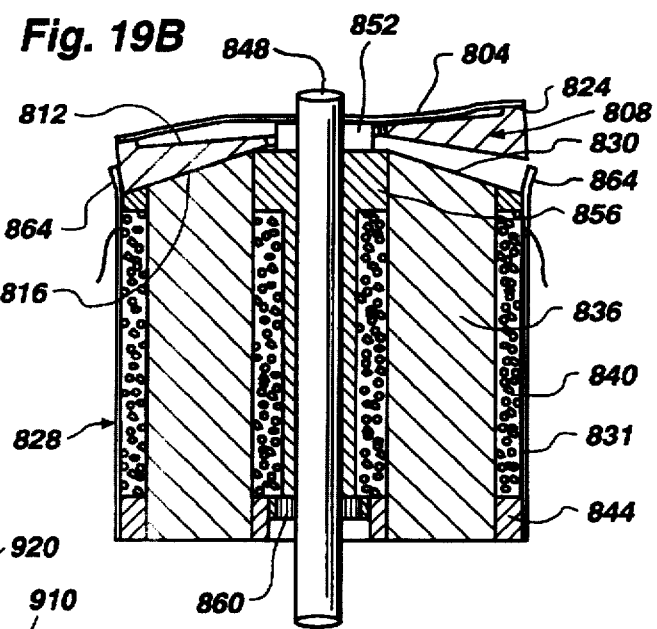

Referring now to FIGS. 19A and 19B, there is shown respectively a top view of a flexible coupling 804 and a side, cross-sectional view of a magnetic eccentric-motion motor which utilizes an inverted conical armature 808. That is, the armature 808 has a generally planar top surface 812 and a concave conical bottom surface 816. The armature 808 is made of a ferromagnetic material as discussed earlier for the armatures of the other embodiments. The coupling 804 is made of a flexible material such as spring steel, and is formed in the shape of a disk with a plurality of partially concentric openings 820 which allow for greater flexibility of the material. The coupling 804 is attached at the perimeter of its underside to an upwardly projecting ridge 824 formed on the top side 812 of the armature 808 at the perimeter thereof.

The armature 808 is disposed to gyrate or rotate on the top of a stator 828 which has a convex conical top surface 830 and which includes a cylindrical housing 831 in which are disposed four electromagnets 832A, 832B, 832C and 832D (see FIG. 19A). The electromagnets 832 are successively energized to thereby successively attract the armature 808 and cause it to gyrate and roll on the stator surface 830 in a circumferential fashion. Each electromagnet 832 includes a core 836 (FIG. 19B) about which is wound a coil 840 for periodically receiving an electric current to thereby develop a magnetic force for attracting the armature 808. An iron end plate 844 is disposed in the bottom of the housing 831 to hold the cores and coils in place.

Disposed to rotate in the stator 828 is a drive shaft 848. Mounted about the shaft 848 at the upper end thereof is a hub 852 to which the flexible coupling 804 is attached as shown in FIG. 19B. The shaft 848 is rotatably contained within an elongate bearing 856 disposed in the center of the stator 828. A retainer ring 860 is disposed at the bottom of the stator housing 831 to circumscribe the shaft 848 and contact the end plate 844.

As the electromagnets 832 are successively energized, the armature 808 is successively attracted to the electromagnets to gyrate and roll on the stator 828 and carry with it the flexible coupling 804. The flexible coupling 804, in turn, is joined to the hub 852 to cause the hub and thus the shaft 848 to rotate as the armature rotates. The armature 808 gyrates in a wobble-type action which is accommodated by the flexible coupling 804, but the shaft 848 is held in place in the stator housing to rotate about a fixed axis. In this manner, a gyrating armature 808 drives the shaft 848 via the flexible coupling 804.

Commutation of the motor of FIG. 19B is carried out by the armature 808 successively contacting conductive contact elements 864, in the form of leaf springs, circumferentially spaced about the stator housing 831 in the path of gyration of the armature. As the contact elements 864 are successively contacted, electrical current is supplied to the next electromagnet in the sequence in the direction of gyration of the armature so that electromagnet produces a force of attraction for the armature causing it to gyrate in that direction, etc., as will be discussed more fully thereafter.

Figure 20A:
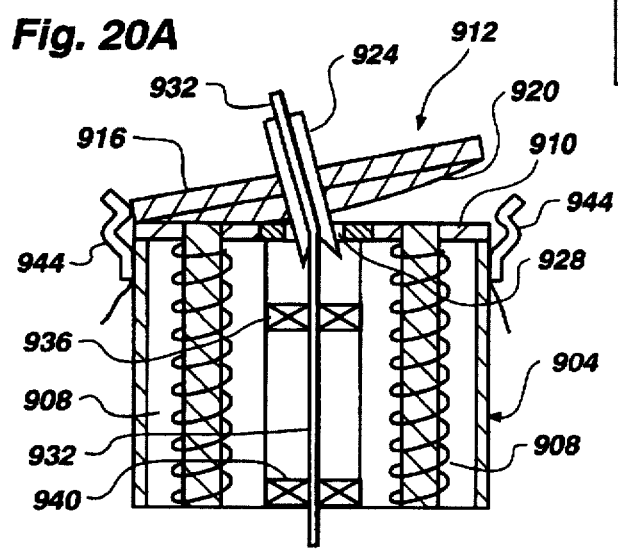
FIGS. 20A and 20B show respectively a side, cross-sectional view and a top view of another embodiment of a magnetic eccentric-motion motor which utilizes a conical rotor.
Figure 20B:
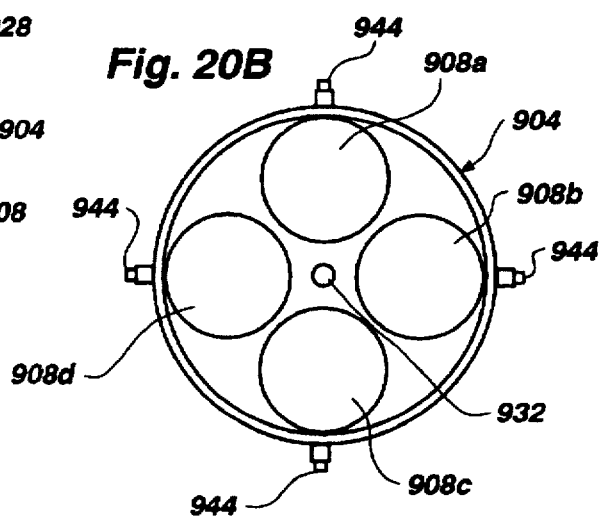

FIGS. 20A and 20B show an alternative embodiment of a conical magnetic eccentric-motion motor in which a stator 904 is again provided with four electromagnets 908A, 908B, 908C and 908D (see FIG. 20B). Disposed to gyrate and roll on the top of the stator housing 904 on a generally flat upper plate 910 is an armature 912 formed with a generally planar top surface 916 and a convex conical bottom surface 920. A central tubular axle 924 is disposed to extend through the center of the armature 912, generally perpendicularly thereto. The lower end of the tubular axle 924 extends below the armature 912 and into an opening 928 formed in the upper plate 910 of the stator housing 904. An angled drive shaft 932 extends through the center of the axle 924 and then bends at the lower end of the axle to extend downwardly through the center of the stator 904. The drive shaft 932 is rotatable within the axle 924 and is rotatably held in place by bearings 936 and 940.

As with the embodiment of FIGS. 19A and 19B, as the electromagnets 908 are successively energized, the armature 920 is attracted theretoward so that the armature gyrates and rolls on the upper plate 910 in a circular motion, and with such gyration, the drive shaft 932 is thereby caused to rotate (at the same speed as the gyration speed of the armature). The armature 920 would be made of a ferromagnetic material, the upper plate 910 of a non-magnetic material such as brass or plastic, the axle 924 of a material such as brass or plastic, and the drive shaft 932 of a metal or metal alloy (to serve as a bearing).

Spaced circumferentially about the exterior of the stator 904 are four contact clips 944 which, when contacted by the armature 912 receive current therefrom (from a current source not shown) and, cause energization of a next one of the electromagnets in succession, to thereby cause successive attraction of the armature so that it gyrates and rolls on the upper plate 910. Various other commutation arrangements will be discussed in greater detail later.

Figure 21A:
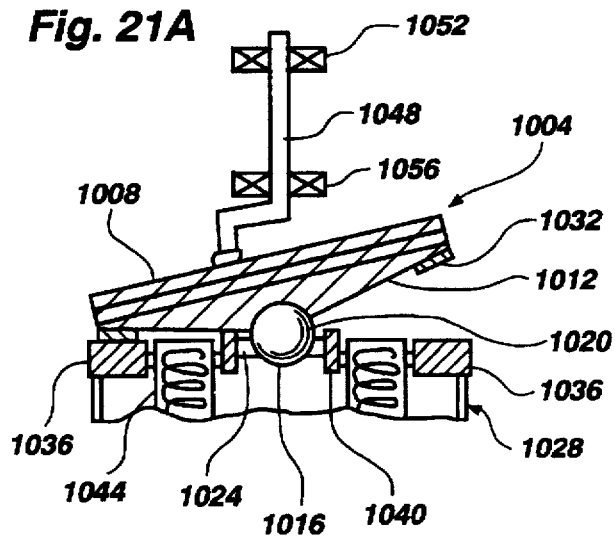
FIGS. 21A and 21B show respectively a side, cross-sectional view and a top, perspective, partially fragmented view of still another embodiment of a conical rotor magnetic eccentric-motion motor.
Figure 21B:
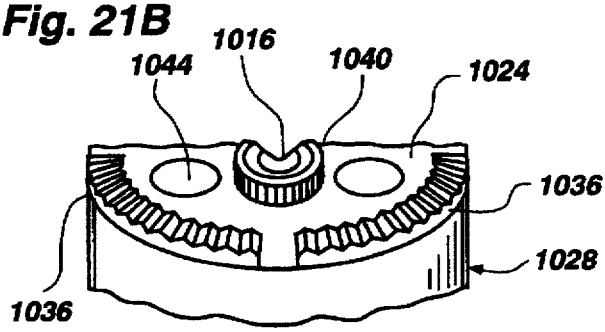

FIGS. 21A and 21B show respectively a side, cross-sectional view and a perspective, partially fragmented view of another embodiment of an magnetic eccentric-motion motor which utilizes a conical armature 1004. Here, the armature 1004 again includes a generally planar upper surface 1008 and a convex conical bottom surface 1012, but the apex of the conical surface being formed with a pivot ball 1016. The spherical pivot ball 1016 is disposed and held rotatably in place in a spherical pocket 1020 formed in the upper surface of a top wall 1024 of a stator 1028. Formed on the conical surface 1012 of the armature 1004 at the perimeter thereof is a ring gear 1032 which circumscribes the armature. The ring gear 1032 is formed to mate with and successively roll on four partial ring gear segments 1036 spaced apart and disposed about the upper perimeter of the stator 1028. Also disposed on the upper wall 1024 of the stator is a conductor ring 1040 which maintains constant contact with the conical bottom surface 1012 of the armature 1004 as the armature gyrates and rotates on the stator as will be described momentarily. Four electromagnets 1044 are disposed in the stator 1028 as with the conical armature motors previously described.

A drive shaft 1048, in the form of a crank, is pivotally coupled at its lower end to the top surface 1008 of the armature 1004 and is held in a generally fixed vertical alignment at its upper end by bearings 1052 and 1056.

In operation, the electromagnets 1044 are successively energized to thereby attract the armature 1004 to cause it to pivot on the pivot ball 1016 and gyrate and roll successively over partial ring gears 1036. That is, the ring gear 1032 successively contacts and rolls over the partial ring gears 1036 as corresponding electromagnets 1044 are energized. As the armature 1004 rotates, it causes the drive shaft 1048 to rotate to provide the desired drive power.

Commutation of the electromagnets 1044 is provided by supplying electrical current to the conductor ring 1040 which current is then supplied via the armature 1004 (which is in constant rolling contact with the conductor ring) to successive ones of the partial ring gears 1036 as those partial ring gears are contacted by the ring gear 1032. The partial ring gears 1036, in turn, supply current to respective electromagnets 1044 to energize those magnets and cause rotation of the armature 1004.

Figure 22A:
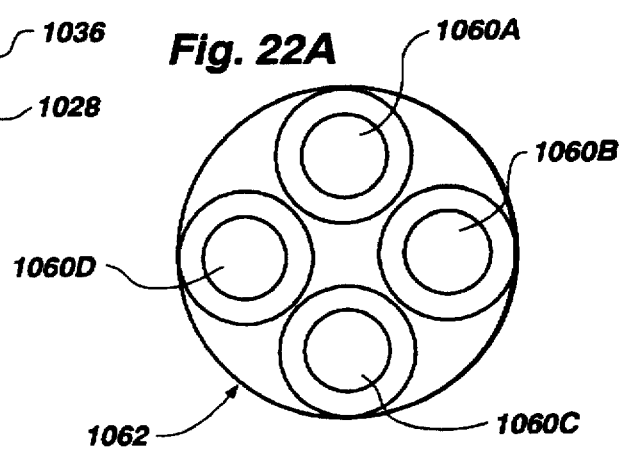
FIGS. 22A and 22B show respectively a top view and a side, cross-sectional view of a further embodiment of a conical rotor magnetic eccentric-motion motor.
Figure 22B:
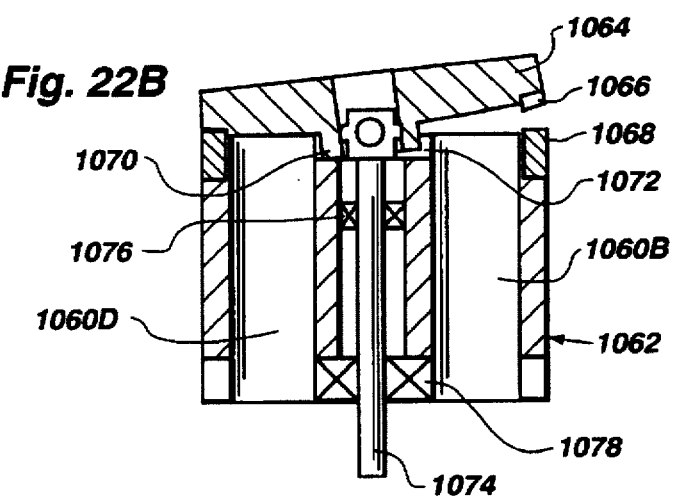

FIGS. 22A and 22B show respectively a top plan view and a side, cross-sectional view of a further embodiment of a magnetic eccentric motion motor. Again, four electromagnets 1060A, 1060B, 1060C and 1060D are provided in a housing 1062 on the top of which a conical rotor or armature 1064 is disposed to gyrate. Gear teeth 1066 are formed on the bottom perimeter of the armature 1064 to intermesh with gear teeth 1068 formed on the upper perimeter of the housing 1062, similar to those conical armature embodiments described earlier. A downwardly projecting annulus 1070 is formed on the bottom surface of the armature 1064 to be received into and gyrate in a cavity 1072 formed in the top of the housing 1062. A drive shaft 1074 is pivotally coupled at its upper end to the armature 1064 and is rotatably held in place by bearings 1076 and 1078. Two exemplary arrangements for coupling the drive shaft 1074 to a conical armature are shown in FIGS. 23 and 24.

Figure 23:
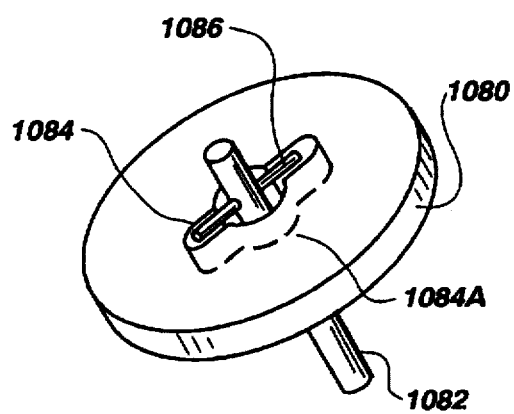
FIG. 23 is a perspective view of a coupling between a conical rotor and a rotor drive shaft of an eccentric-motion motor.

Referring to FIG. 23, there is shown a conical armature 1080 coupled to a drive shaft 1082. An elongate cavity 1084 is formed in the top of the armature 1080 with a center portion 1084A extending all the way through the armature to receive the upper end of the drive shaft 1082. A cross piece 1086 is disposed in a transverse opening in the drive shaft 1082 and is received in the cavity 1084 to prevent the drive shaft from sliding out of the central section 1084A while allowing the drive shaft to pivot about the axis of the cross piece and about an axis orthogonal to the cross piece. The cavity 1084 is formed to be large enough to allow pivoting movement of the drive shaft 1082 in the directions indicated so that as the armatures 1080 were caused to gyrate on a stator housing, the drive shaft could remain in a substantially fixed vertical position in the stator housing.

Figure 24:
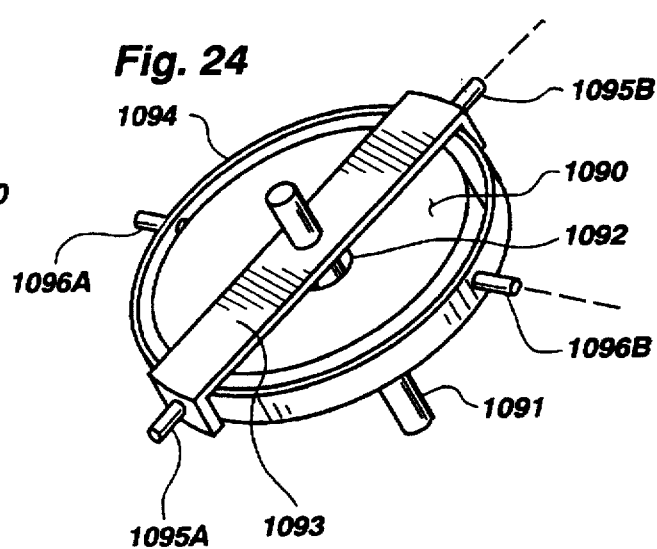
FIG. 24 is a perspective view of another embodiment of a coupling between a conical rotor and a rotor drive shaft of an eccentric-motion motor.

FIG. 24 shows an alternative coupling arrangement between an armature 1090 and a drive shaft 1091, in the form of a U-joint. The drive shaft 1091 extends through an opening 1092 in the armature 1090 and is rigidly attached to a cross bar 1093 which diametrically bridges across and is pivotally mounted on a ring 1094 which circumscribes the armature. The cross piece 1090 is mounted to pivot on pins 1095A and 1095B which extend in diametrically opposite directions from the ring 1094 to thus allow pivoting of the drive shaft 1091 relative to the ring 1094. The ring 1094, in turn, is pivotally mounted to the armature 1090 on pins 1096A and 1096B which extend in diametrically opposite directions from the armature. The pivotal mounting of the ring 1094 to the armature 1090 allows the drive shaft 1091 to pivot about an axis defined by the linear axis of the pins 1096A and 1096B, as well as about an axis defined by the linear axis of the pins 1095A and 1095B. Thus, the drive shaft 2091 may be maintained generally vertical while the armature 1090 is gyrating on the upper surface of a stator housing as earlier described.

Figure 25:
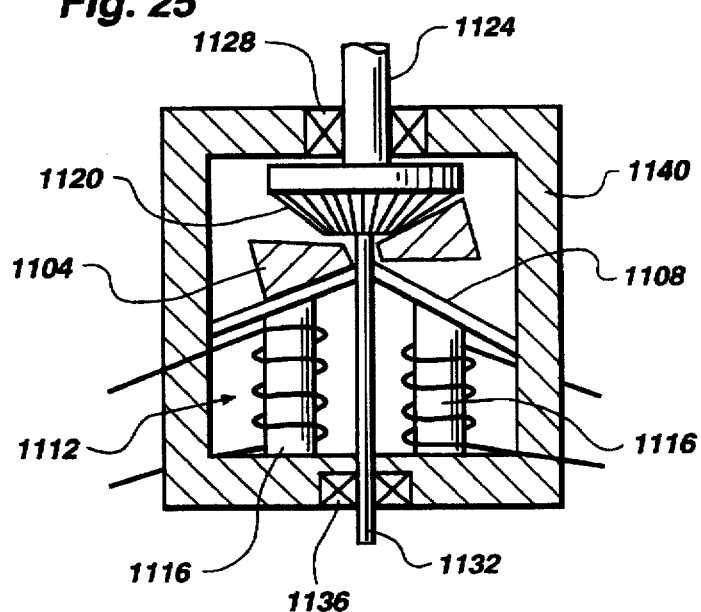
FIG. 25 is a side, cross-sectional view of a further embodiment of a conical rotor magnetic eccentric-motion motor with a non-wobble shaft configuration.

FIG. 25 shows a side, cross-sectional view of another conical armature magnetic motor embodiment made in accordance with the present invention. In this embodiment, a bi-conical armature 1104 (concave conical top and bottom surfaces with gear teeth) is provided to gyrate and rotate on the conical upper surface 1108 (with gear teeth) of a stator 1112. Again, successive energization of electromagnets 1116 cause the armature 1104 to gyrate and rotate on the stator surface 1108 and as it does so, the upper conical surface of the armature simultaneously contacts a conical gear 1120 to cause it to rotate. The conical gear 1120 is coupled at its upper surface to a drive shaft 1124 which is held in a fixed rotatable position by bearings 1128, and is coupled at its lower surface to another drive shaft 1132 which is rotatably held in place by bearings 1136. The bearings 1128 and 1136, and the stator 1112 are housed in a housing 1140.

Figure 26:
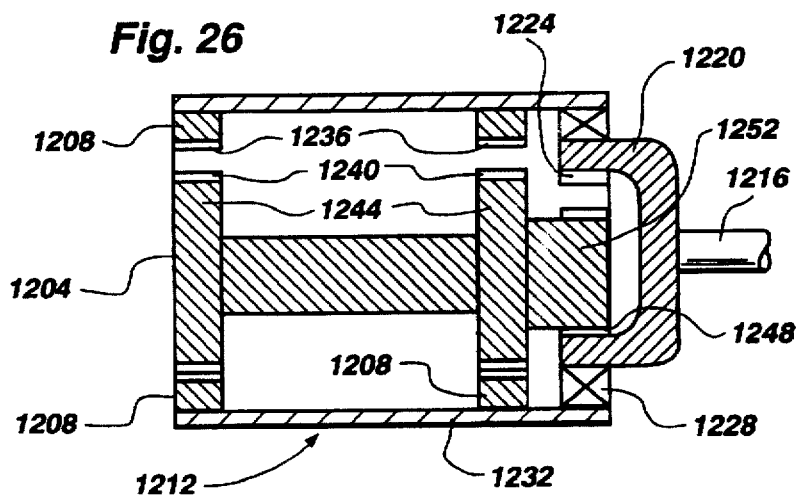
FIG. 26 is a side, cross-sectional view of a magnetic eccentric-motion motor gear coupling mechanism made in accordance with the principles of the present invention.

FIG. 26 shows a gear coupling arrangement for coupling an armature 1204 (which moves in an eccentric-motion fashion on tracks 1208 of a stator 1212), to a drive shaft 1216. The drive shaft 1216 is joined to a coupling ring 1220 on the inside surface of which is formed a ring gear 1224. The coupling ring 1220 is disposed to rotate in a ring bearing 1228 disposed in a housing 1232 of the stator 1212. Meshing gears 1236 and 1240 are formed respectively on the tracks 1208 and on disks 1244 of the armature 1204. Similarly, a ring gear 1248 is formed about a forwardly projecting cylinder 1252 to mesh with the ring gear 1224. As the armature 1204 is caused to move on tracks 1208 (by electromagnets as previously described but not shown in FIG. 3), the ring gear 1248 on the projecting cylinder 1252 of the armature meshes with and drives the ring gear 1224 of the coupling ring 1220 causing the coupling ring to rotate. As the coupling ring 1220 rotates, the drive shaft 1216 is caused to rotate in a fixed "non-orbiting" position. In this manner, the eccentric-motion motor of FIG. 23 drives the drive shaft 1216 via a unique gear-coupling mechanism.

FIGS. 27A and 27B show another eccentric-motion motor coupling arrangement for coupling an eccentrically rotating armature 1304 to a drive shaft 1308. The drive shaft 1308 is rotatably held in a fixed position by bearing 1312 disposed in a housing 1316. The armature 1304 includes a hollow bore 1320 through which extends a rod 1324 fixed at one end to the center of a flexible disk 1328 which is attached at several points on its perimeter to the armature 1304. The other end of the rod 1324 is joined to the center of a flexible disk 1332 which is attached at several points on its perimeter to a rigid the drive shaft 1308. The disk 1332 and ring 1334 are joined by a plurality of circumferentially spaced apart, rigid fingers 1336. The flexible disks 1328 and 1332 may be constructed similar to the flexible coupling 804 of FIGS. 19A and 19B. As the armature 1304 rotates in a stator 1348, the disk 1328 is caused to rotate, causing the rod 1324 to rotate. As the rod 1324 rotates, disk 1332 rotates, and thus the coupling ring 1334 connected to the drive shaft 1308 is caused to rotate to thereby drive the drive shaft 1308 as desired. Since the disks 1328 and 1332 are flexible, the rod 1324 is allowed to pivot and process relative to the drive shaft 1308 to thus transfer rotational power of the armature via the rod to the drive shaft.

FIG. 28 is a side, cross-sectional view of an eccentric-motion motor having an adjustable gear ratio feature. A frusto-conical rotor 1404 is disposed to rotate in an eccentric motion within a stator 1408 as earlier described. One end of the rotor 1404 is coupled to a flexible drive shaft 1412 which is slidably and rotatably held in place by bearings 1416.

The drive shaft 1412 may be moved longitudinally (as indicated by the arrow 1420) to vary the depth of the rotor 1404 in the stator 1408, and thus vary the speed of rotation of the rotor. That is, as the drive shaft 1412 is moved to the right, looking down at FIG. 28, the speed of rotation of the rotor 1404 is increased, whereas when the drive shaft 1412 is moved to the left, the rotor 1404 moves further into the stator 1408 and the speed of rotation is caused to decrease. In this manner, the gear ratio may be adjusted by simply moving the drive shaft 1412 longitudinally.

Figure 29:
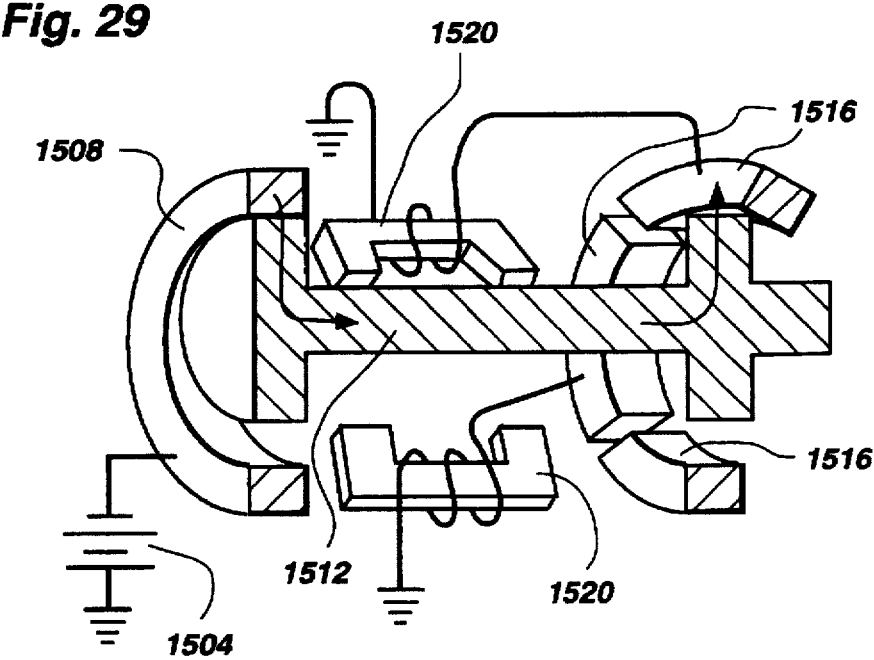
FIG. 29 is a perspective side, cross-sectional view of a magnetic eccentric-motion motor with one embodiment of a commutation arrangement.

FIG. 29 illustrates one illustrative commutation arrangement for the eccentric-motion motors of the present invention. In this embodiment, a source of current 1504 is coupled to a conductive track 1508 in which one end of an armature 1512 rolls. Current supplied to the track 1508 flows into the conductive armature 1512 and then to successive ones of track segments 1516 over which the other end of the armature 1512 rolls. Current received by one of the track segments 1516 flows to a respective electromagnet 1520 to cause the electromagnet to attract the armature 1512 and cause it to roll within the tracks 1508 and 1516. As the armature 1512 rolls out of contact with one of the track segments 1516 and into contact with another of the track segments, a next successive electromagnet 1520 is then energized to attract the armature in the direction of that electromagnet causing the armature to continue to roll. In this manner, commutation of the electromagnets 1520 is automatically provided as the armature 1512 is caused to roll.

Figure 30:
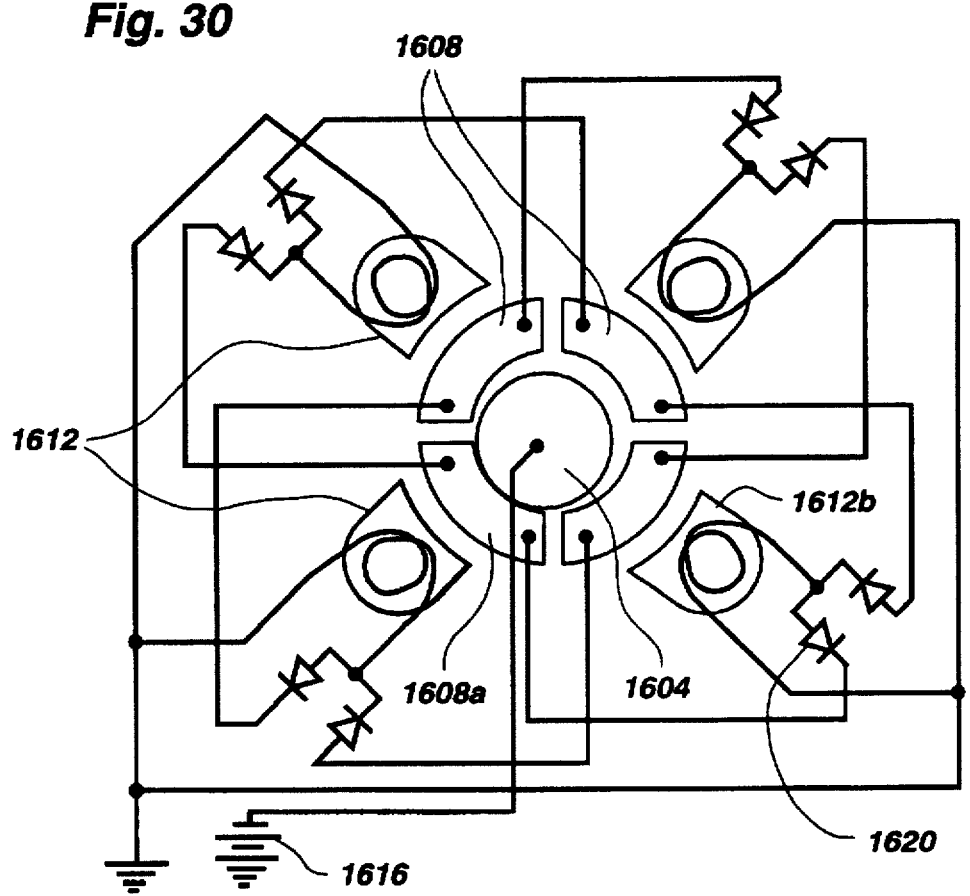
FIG. 30 is a top view of a magnetic eccentric-motion motor with another embodiment of a commutation arrangement.

FIG. 30 shows a schematic of a commutation arrangement for bi-directional rotation of a rotor 1604 within four conductive segments 1608 of a stator. Electromagnets 1612 are positioned adjacent each of the segments 1608 to successively attract the rotor 1604 and cause it to roll in the stator. The electromagnets 1612 may be successively energized in either direction by a current source 1616 supplying current to the conductive rotor 1604 which, in turn, supplies the current to which ever stator segment 1608 the rotor is presently contacting. From that stator segment, the current flows to the electromagnet 1512 adjacent to the stator segment 1608 toward which the rotor 1604 is rolling. For example, assume the rotor 1604 is rolling in the counter-clockwise direction and is in contact with stator segment 1608a. In this position, current flows from the rotor 1604 through stator segment 1608a and through a diode 1620 to the electromagnet 1612b. The electromagnet 1612b, is thus energized to attract the rotor 1604 to cause it to continue its counter clockwise movement. For movement of the rotor 1604 in the clockwise direction, the polarity of the current source 1616 is simply changed.

Coupling of the current source 1616 to the rotor 1604 could be carried out by first coupling the current source to a conductive ring in which the rotor rolls and maintains continuous contact therewith. Alternatively, wiper contact elements could interconnect the current source to the rotor.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An eccentric-motion motor comprising a stator defining a continuous closed surface pathway, a plurality of elongate permanent magnets disposed in an array at the closed surface, the magnets having enlarged end pieces being disposed to form the continuous closed surface pathway, an armature comprising a bar of ferromagnetic material disposed to roll on the closed surface pathway, an electrical conductor for receiving electrical current and helically spaced out of contact with and about the armature and out of electrical contact with the stator, said conductor suspended through electrically insulated apertures in the stator, the apertures having electrically insulated sleeves, the sleeves having an outer portion in contact with the aperture and an inner portion in contact with and compressed about leads of the conductor, and means for supplying electrical current of selectively alternatable polarity to the conductor to successively cause the armature to switch polarities and thereby be attracted toward and repelled from the permanent magnets to thus roll on the pathway.

2. A motor as in claim 1 wherein said permanent magnets comprise elongate bars disposed generally in parallel with one another in a circumferential array about the armature to define a hollow cylindrical stator, said stator further including a pair of tracks positioned circumferentially in a spaced-apart relationship in the stator hollow for rollably receiving the armature, wherein said conductor is disposed helically in the stator hollow so that the armature may roll on the tracks without contacting the conductor, and wherein said armature is disposed in the stator hollow to roll on the tracks.

3. A motor as in claim 2 wherein adjacent poles of the permanent magnets have opposite polarity.

* * * * *